United States Patent
Kingsley, Jr. et al.

(10) Patent No.: US 12,452,688 B2
(45) Date of Patent: Oct. 21, 2025

(54) APPARATUS AND METHOD AVOIDING CBSD INITIALIZATION

(71) Applicant: CHARTER COMMUNICATIONS OPERATING, LLC, St. Louis, MO (US)

(72) Inventors: Bernard R. Kingsley, Jr., Castle Rock, CO (US); Praveen Srivastava, Ashburn, VA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 654 days.

(21) Appl. No.: 17/866,774

(22) Filed: Jul. 18, 2022

(65) Prior Publication Data

US 2024/0022917 A1    Jan. 18, 2024

(51) Int. Cl.
*H04W 16/18* (2009.01)
*H04W 16/10* (2009.01)
*H04W 64/00* (2009.01)

(52) U.S. Cl.
CPC ........... *H04W 16/18* (2013.01); *H04W 16/10* (2013.01); *H04W 64/006* (2013.01)

(58) Field of Classification Search
CPC .... H04W 16/18; H04W 16/10; H04W 64/006
See application file for complete search history.

(56) References Cited

U.S. PATENT DOCUMENTS

| | | | |
|---|---|---|---|
| 7,784,344 B2 | 8/2010 | Pavelescu et al. | |
| 8,351,773 B2 | 1/2013 | Nasiri et al. | |
| 9,121,922 B2 | 9/2015 | Jarvis et al. | |
| 10,349,218 B2 | 7/2019 | Talluri et al. | |
| 2022/0132463 A1* | 4/2022 | Cha | H04B 17/27 |

FOREIGN PATENT DOCUMENTS

| | | | | |
|---|---|---|---|---|
| KR | 100424159 B1 * | 3/2004 | ......... | H04W 64/006 |
| KR | 20050021890 A * | 3/2005 | | |

* cited by examiner

*Primary Examiner* — Mandish K Randhawa
(74) *Attorney, Agent, or Firm* — Patent Beach PC

(57) ABSTRACT

Various embodiments comprise systems, methods, architectures, mechanisms and apparatus wherein network nodes such as macrocell RANs, small/micro cell RANs, Wi-Fi Access Points (APs) and the like are modified to include a velocity sensor configured to determine if any GPS-perceived location change is accurate and, if not, to avoid or inhibit invoking restart/initialization of the network node normally invoked in response to the change in location of the network node.

21 Claims, 3 Drawing Sheets

APPARATUS AND METHOD AVOIDING CBSD INITIALIZATION

FIELD OF THE DISCLOSURE

The present disclosure generally relates to wireless communications systems, and more particularly to improving operating uptime of portable communication nodes.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Network Operators may deploy network nodes adhering to mobile network protocols, such as 5th Generation New Radio (5G-NR) as described in various documents of the Third Generation Partnership Project (3GPP), are increasingly relying on wireless macrocell radio access networks (RANs) such as traditional cellular base stations, eNBs and the like, along with wireless small cell or microcell RANs in order to deploy, for example, indoor voice and data services to enterprises and other customers. Network Operators may deploy network nodes adhering to various Wi-Fi network protocols, such as the 802.11xx or other Wi-Fi protocols.

For macrocell RANs, small/micro cell RANs, Wi-Fi Access Points (APs) and the like, increasing demands for wireless throughput make access to additional spectrum desirable, including both licensed and unlicensed spectrum. Unlicensed spectrum may comprise, illustratively, the Citizens Broadband Radio Service (CBRS) band at ~3.5 GHz which is utilized by Citizens Broadband Radio Service Devices (CBSDs) registered with a Spectrum Access System (SAS) capable of adapting CBSD operation in accordance with the Generic Authorized Access (GAA) requirements, network congestion, network interference and the like. The SAS performs various functions such as determining/assigning frequencies, operating parameters (e.g., transmission power on those frequencies), and the like to CBSDs such as within a mobile network.

The location of a Small Cell, Wi-Fi AP, or other network node communicating via unlicensed spectrum is used by regulatory bodies (e.g., as enforced by the SAS or similar network management entity) to determine the channels or frequencies allowed to be used by the network node. To determine the location for a small cell/AP, location is primarily established via a Global Positioning System (GPS) receiver.

Network nodes such as small Cells/APs routinely validate location to ensure both timing and location are correctly registered. Occasionally, such network nodes will detect a change in location and, to ensure/validate that the correct frequencies are being used at this new location, perform a cold or warm restart to invoke initialization procedures (e.g., Plug and Play) that will ensure correct frequency selection and associated radiation permissions.

Unfortunately, such a restart/initialization disrupts the network services normally provided by the network node, typically from 5 minutes to 24 hours. The restart/initialization may also impact the frequency and power level availability from the Spectrum Coordination systems such as Spectrum Access Systems (SASs) or Automatic Frequency Coordinators (AFCs). For example, if a 6 GHz WiFi radio is considered to have moved based on imprecise location information, then transmit power may be reduced to a level appropriate to the indicated new location, which transmit power may be insufficient and therefore impact Quality of Service (QoS) for subscribers.

SUMMARY

Various deficiencies in the prior art are addressed by systems, methods, and apparatus for avoiding unnecessary restart/initialization of network nodes such as macrocell RANs, small/micro cell RANs, Wi-Fi Access Points (APs) and the like due to GPS drift (i.e., a difference between an actual location of a network node and a location of the network node as recorded by a GPS receiver in or attached to the network node). Specifically, restart/initialization of a network node is appropriate when detection of a new location of the network node is due to actual relocation of the network node, but wasteful if the "new" location is merely an artifact of GPS drift within the GPS receiver.

Various embodiments contemplate that a network nodes such as macrocell RANs, small/micro cell RANs, Wi-Fi Access Points (APs) and the like are modified to include a velocity sensor configured to determine if any GPS-perceived location change is accurate and, if not, to avoid or inhibit invoking restart/initialization of the network node normally invoked in response to the change in location of the network node.

A network node according to an embodiment and configured to provide network services to user equipment (UE) attached thereto comprise a global positioning system (GPS) receiver, configured to detect a location of the network node; a processor, configured to invoke an initialization of the network node in response to a detection of a new location of the network node; and a velocity sensor, configured to detect a force indicative of a movement of the network node; wherein the processor is further configured to inhibit initialization of the network node in response to the velocity sensor indicating less than a threshold level of motion. The velocity sensor may comprise any of a piezoelectric velocity sensor. a Micro Electro-Mechanical System (MEMS) velocity sensor, a moving coil velocity sensor, or other type of velocity sensor. The network node may comprise a Citizens Broadband Radio Service Device (CBSD) utilizing spectrum associated with the Citizens Broadband Radio Service (CBRS) to provide network services to user equipment (UE) attached thereto, wherein the initialization of the network node comprises at least SAS spectrum inquiry and spectrum grant procedures.

A method according to an embodiment comprises, at a network node including a velocity sensor and configured to provide network services to user equipment (UE) attached thereto, determining via the velocity sensor whether a change in location reported by a global positioning system (GPS) receiver is correct; and at the network node, responsive to a determination that the change in location reported by the GPS receiver is not correct, inhibiting an initialization of the network node normally invoked in response to the change in location of the network node.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
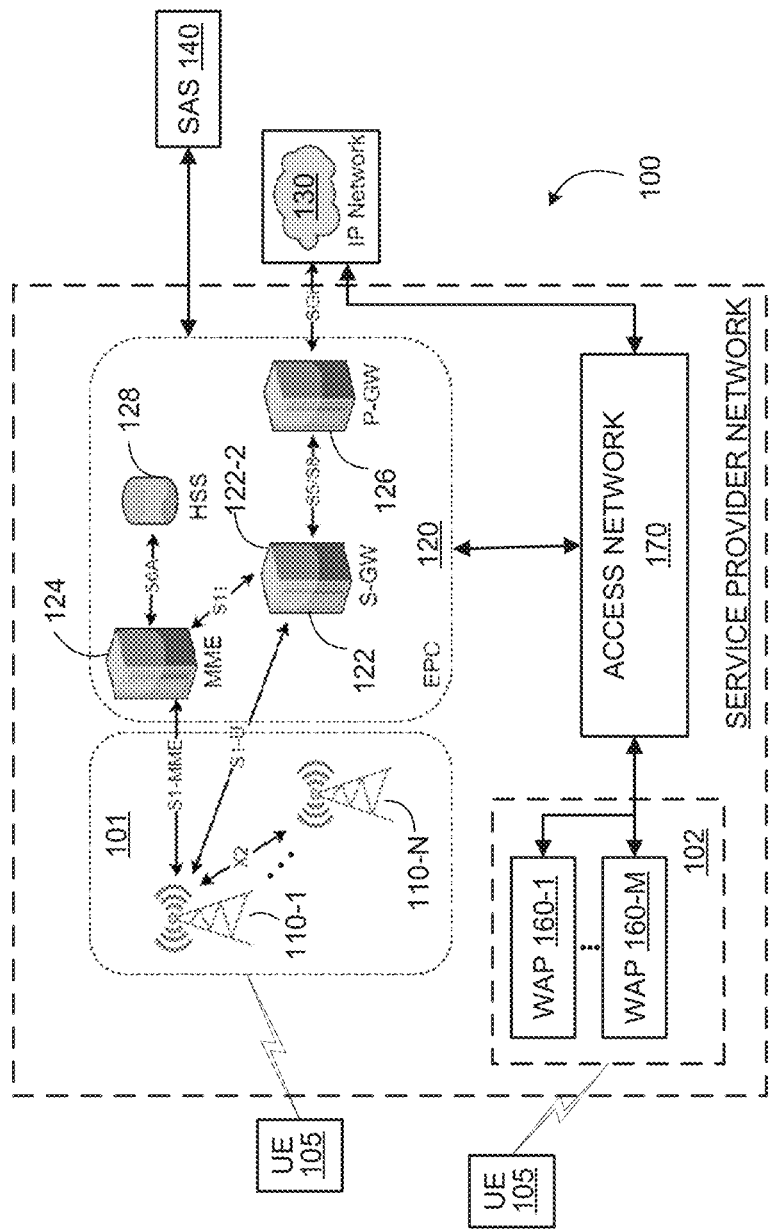
FIG. 1 depicts a network services architecture including various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments are primarily relevant to those network nodes (or other devices) that are movable (i.e., not a fixed installation) since only those nodes or devices will exhibit changes in their location. As such, though broadly applicable to any network node (or other device) configured to invoke a restart/initialization in response to a change in location, the discussion herein will be primarily directed to smaller or portable network nodes such as small/micro cell RANs, Wi-Fi APs, and the like. As generally discussed herein, small/micro cell RANs, Wi-Fi APs, and the like generally describe a small portable radio access points, base station, Wi-Fi hotspots and the like having relatively low radio frequency power, range, and coverage area such as might be temporarily deployed to augment existing network coverage (e.g., such as to temporarily increase network capacity for an indoor or outdoor event or other expected need). These small/micro cell RANs, Wi-Fi APs, and various other movable communications or network nodes using unlicensed spectrum may be permanently or temporarily installed as needed. All of these network nodes benefit from the various embodiments.

Various embodiments are directed to avoiding unnecessary restart/initialization of network nodes such as macrocell RANs, small/micro cell RANs, Wi-Fi Access Points (APs) and the like due to GPS drift (i.e., a difference between an actual location of a network node and a location of the network node as recorded by a GPS receiver in or attached to the network node). Specifically, restart/initialization of a network node is appropriate when detection of a new location of the network node is due to actual relocation of the network node, but wasteful if the "new" location is merely an artifact of GPS drift within the GPS receiver.

Various embodiments contemplate that a network nodes such as macrocell RANs, small/micro cell RANs, Wi-Fi Access Points (APs) and the like are modified to include a velocity sensor configured to determine if any GPS-perceived location change is accurate and, if not, to avoid or inhibit invoking restart/initialization of the network node normally invoked in response to the change in location of the network node.

In one embodiment, if a small cell/AP perceives a location change via GPS, but the velocity sensor/MEMS does not sense movement, then the controller of the small cell/AP may reasonably assume that the perceived location change in merely GPS Drift and restart/initialization is avoided. However, if the small cell/AP perceives a location change via GPS, and both of the Velocity Sensor/MEMS also indicate motion, then a restart/initialization is be triggered. In various embodiments the velocity sensor enables the small cell/AP to pause GPS acquisition until after motion has stopped, thereby avoiding multiple restarts/initializations.

FIG. 1 depicts a network services architecture including various embodiments. Specifically, FIG. 1 depicts a service provide network comprising deployed networking or telecommunications infrastructure configured to provide network services (e.g., voice, streaming media, data upload/download etc.) services to respective subscribers/users via user equipment (UE) 105 configured to communicate with network nodes such as mobile network nodes 110 and/or Wi-Fi access points 160.

As depicted in FIG. 1, the services provider network comprises a first network 101 including a plurality of mobile network nodes 110-1 through 110-N comprising, illustratively, small cells, microcells and the like such as eNodeBs (eNBs) and similar types of provider equipment or logical radio nodes (e.g., gNBs) derived therefrom. Each mobile network node 110 provides network services to UE 105 via respective radio bearer (channels/resources) which are managed by various Radio Resource Management functions, such as Radio Bearer Control, Radio Admission Control, Connection Mobility Control, Scheduling of UEs in both uplink and downlink and so on. As depicted, the mobile network nodes 110 communicate with a core network comprising, illustratively, a core network 120 comprising a Serving Gateway (SGW) 122, a Mobility Management Entity (MME) 124, a Packet Data Network (PDN) Gateway (PGW) 126, a Home Subscriber Server (HSS) 128, and various other network elements (not shown) operative to provide the various functions necessary to enable UE authentication, network services, application services and the like as is known. While the core network 120 is depicted as comprising a 4G/LTE core network, it will be appreciated that other types of core networks/architectures may also be used to provide the network services and the like discussed herein, such as 5G-NR core networks and the like.

As depicted in FIG. 1, the services provider network comprises a second network 102 including a plurality of wireless access points (APs or WAPs) 160-1 through 160-M comprise in, illustratively, 802.11xx wireless access points deployed at homes, businesses or other locations and configured to communicate with UE 105 and with an access network 170, which is configured to provide network services via one or more external networks 130.

The mobile network nodes 110 and/or WAPs 160 may be distributed over a "coverage footprint" to provide network services to mobile devices such as the UE 105 discussed herein. Further, such distribution may be augmented using mobile network nodes 110 and/or WAPs 160 configured to utilize unlicensed spectrum in addition to, or instead of, licensed spectrum. That is, the MVNO network may include network nodes 110 or APs 160 configured to utilize unlicensed or shared spectrum in various unlicensed spectral regions, such as high bands (24 GHz-40 GHz for 5G), mid bands (3.5 GHz-6 GHz and/or 1 GHz-2.6 GHz for 4G/LTE/5G), and low bands (<1 GHz for 4G/LTE/5G), and other shared spectrum.

As depicted in FIG. 1, the UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE associated with mobile network protocols (e.g., 3G/4G/LTE/5G), WiFi protocols (e.g., 802.xx), and/or other communications protocols.

In various embodiments, at least some of the mobile network nodes 110 and/or APs 160 of the service provider network are configured to operate in at least some modes of operation as Citizens Broadband Radio Service Devices (CBSDs) utilizing spectrum associated with the Citizens Broadband Radio Service (CBRS), which is currently configured as a 150 MHz band between 3.55 GHz and 3.70 GHz. CBSD access to this unlicensed spectrum is granted via a Spectrum Access System (SAS) 140 operating in accordance with, illustratively, a CBSD-SAS discovery, authentication, registration, spectrum inquiry, spectrum grant, heartbeat, grant relinquishment, grant suspension, deregistration, and/or other procedures such as that described in the WINNF-TS-0016 standards document.

Various embodiments contemplate that a network nodes such as macrocell RANs, small/micro cell RANs, Wi-Fi Access Points (APs) and the like are modified to include a velocity sensor configured to determine if any GPS-perceived location change is accurate and, if not, avoid invoking restart/initialization of the network node.

Various elements or portions thereof depicted in FIG. 1 and having functions described herein are implemented at least in part as computing devices having communications capabilities, including for example the UE 105, mobile network nodes 110, SAS 140, WAPs 160, access network 170, and various portions of the core networks 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
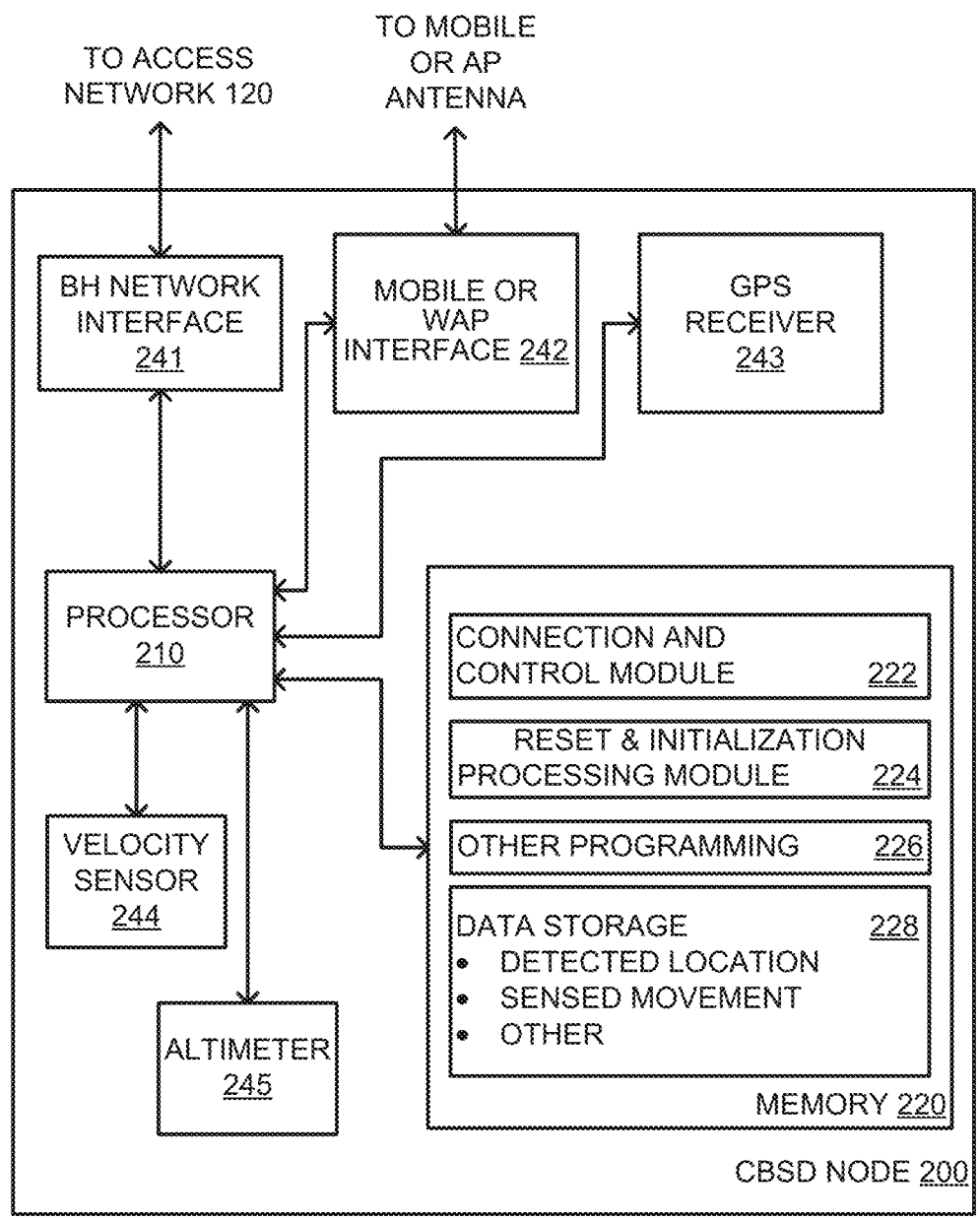
FIG. 2 depicts block diagram of an exemplary CBSD node suitable for use in the network services architecture of FIG. 1.

FIG. 2 depicts block diagram of an exemplary CBSD node suitable for use in implementing a mobile network node 110 or WAP 160 within the network services architecture of FIG. 1. Specifically, the CB SD node 200 of FIG. 2 is depicted as including one or more processor(s) 210, a memory 220, a backhaul network interface/transceiver 241, a mobile network or wireless access point (WAP) interface/transceiver 242, a global positioning system (GPS) receiver 243, a velocity sensor 244 and, optionally, an altimeter 145.

The processor(s) 210 is coupled to, and adapted to cooperate with, the memory 220, the communications interfaces/transceivers 241-242, the GPS receiver 243, the velocity sensor 244, as well as various other support circuitry (not shown) to provide the various functions as described herein with respect to the gateway 200, APs 110 and the like.

Memory 220 includes random access memory (RAM), read only memory (ROM), and/or flash memory, and stores information in the form of data and instructions. These instructions that can be executed by processor(s) 210. Various types of instructions may be stored in memory 220. For instance, memory 220 may store instructions that control the operation of communication interfaces/transceivers 241-242, the GPS receiver 243, the velocity sensor 244, and perform the various location detection, motion sensing, and initialization functions disclosed and discussed herein with respect to the figures, as well as the operation of other elements within the CBSD node 200 (not shown).

The BH interface 241 as depicted herein are configured to support backhaul communications with the core network 120 or access network 170.

The mobile network or wireless access point (WAP) interface/transceiver 242 as depicted herein is configured to support communications with UE 105 via a mobile network protocol (in the case of CBSD 200 comprising a mobile network node 110) or a Wi-Fi protocol (in the case of CBSD 200 comprising a WAP 160).

The GPS receiver 243 is configured to receive and process GPS location information or similar information from a satellite-based location system to determine thereby a location of the CBSD 200. If the location of the CBSD 200 has changed by more than a threshold amount since the CB SD 200 received a spectrum grant from the SAS 140, then the reset & initialization routine is invoked so as to negotiate a new spectrum grant from the SAS 140, wherein the new spectrum grant is appropriate to the new location of the CB SD 200. In various embodiments, the GPS receiver 243 either alone or in cooperation with the optional altimeter 145 provides positional information of sufficient accuracy so as to provide altimeter information associated with the CB SD 200.

The velocity sensor 244 is configured to detect motion of the CBSD 200 itself. The velocity sensor may comprise a piezoelectric velocity sensor, a Micro Electro-Mechanical System (MEMS) velocity sensor, a moving coil velocity sensor, or a velocity sensor formed using some other suitable technology. The purpose of the velocity sensor is to verify that a change in location indicated by the GPS receiver is a result of an actual change in location rather than GPS drift. In various embodiments, the velocity sensor 244 detects motion and associates that motion with timestamp information such that a displacement of the CB SD 200 may be calculated.

The optional altimeter 245 is configured to detect changes in altitude the CBSD 200 itself. The altimeter 245 may comprise a barometric altimeter, GPS altimeter, or an altimeter formed using some other suitable technology. In some embodiments, an altimeter function is provided using the GPS receiver 243 by itself or in cooperation with the optional altimeter 145. In various embodiments, the optional altimeter 245 detects changes in altitude and associates that change in altitude with timestamp information such that a height displacement of the CBSD 200 may be calculated.

The GPS receiver 243 may provide information indicative of a change in position of the CBSD 200 such that a restart/initialization of the CB SD 200 seems to be appropriate. The GPS receiver 243 may occasionally lose contact with a requisite number of GPS satellites from time to time such as due to "shading" of the satellite signal(s) due to a nearby building or other structure, which loss of contact may also indicate that a restart/initialization of the CBSD 200 seems to be appropriate.

The velocity sensor 244 provides information suitable for use in determining whether the CBSD has been moved in a manner consistent with the position indicated by the GPS receiver 243, in which case the restart/initialization of the CBSD 200 is appropriate. For example, the velocity sensor 244 may detect a lateral force detect a force indicative of a movement of the CBSD 200, such as a force having a particular magnitude, direction, and/or duration which may be used to estimate a change in position of the CB SD 200 and determine if the estimated change in position of the CBSD 200 is consistent with the position indicated by the GPS receiver 243. Depending on the type of velocity sensor utilized, both acceleration and deceleration of the CBSD 200 may be sensed, such as that associated with the CBSD 200 dropping from a mount onto a floor. Such change in height may also be detected by the altimeter 245 if the type of altimeter utilized is sensitive enough to detect such a change in altitude. Such change in height may also be detected by the velocity sensor 244 when a number of short force measurements are noted consistent with the CB SD 200 being dropped.

The memory 220, generally speaking, stores programs, data, tools and the like that are adapted for use in providing various functions as described herein with respect to the figures. For example, the memory 220 is depicted as storing instructions associated with a connection and control module 222, a reset & initialization processing module 224, various other programming 226, as well as data storage 228 (including storage for location information, motion information, and various other information), which instructions cause the respective modules either individually or in combination to perform the various functions of the embodiments described herein. The memory 220 stores instructions controlling the transmission and reception of data via the various interfaces 241-242 in accordance with the appropriate communications protocols, data and control formats, timing requirements, packet structures and the like.

Figure 3:
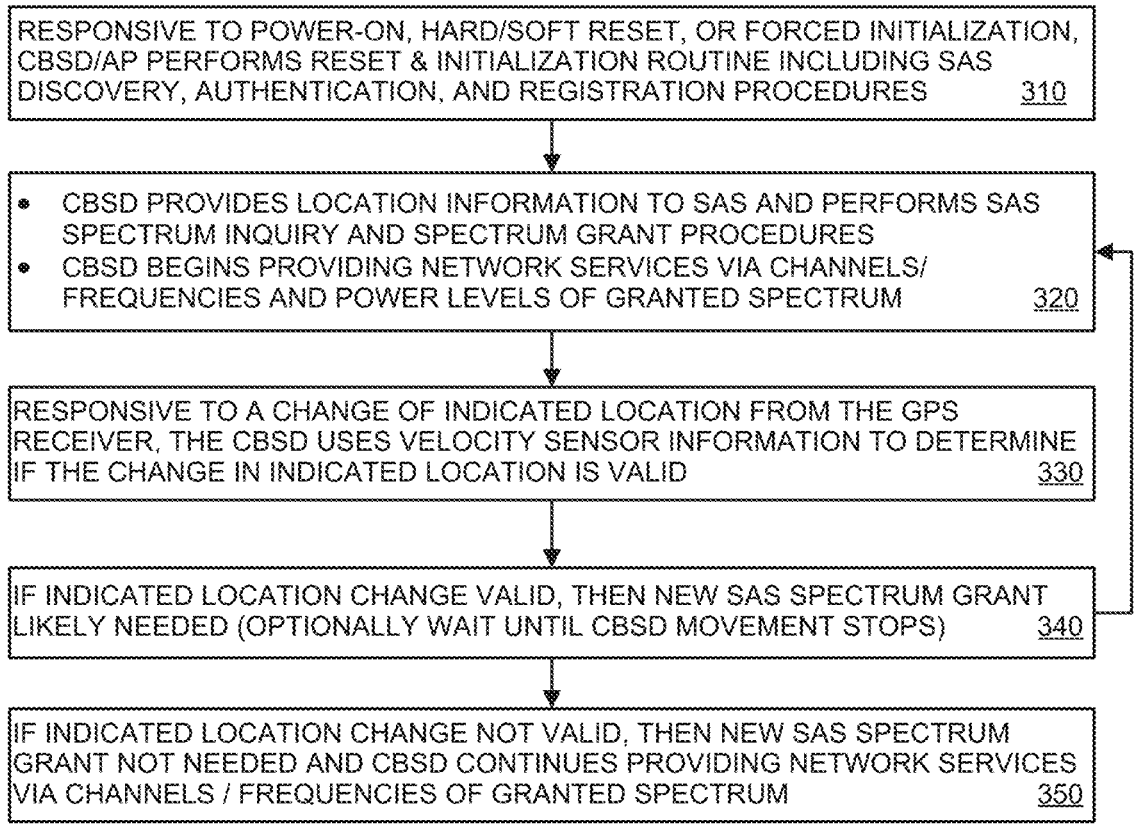
FIG. 3 depicts a flow diagram of a method in accordance with the embodiments.

FIG. 3 depicts a flow diagram of a method in accordance with the embodiments. Specifically, FIG. 3 depicts a method 300 suitable for use in a mobile network node 110 or WAP 160 operating as a CBSD node, such as within the network services architecture of FIG. 1. The method 300 is directed to avoiding unnecessary restart/initialization of network nodes such as CB SD macrocell RANs, small/micro cell RANs, Wi-Fi Access Points (APs) and the like operating due to GPS drift (i.e., a difference between an actual location of a network node and a location of the network node as recorded by a GPS receiver in or attached to the network node). Specifically, restart/initialization of a network node is appropriate when detection of a new location of the network node is due to actual relocation of the network node, but wasteful if the "new" location is merely an artifact of GPS drift within the GPS receiver.

At step 310, responsive to a to a power-on, hard/soft reset, or forced initialization, the CB SD performs reset & initialization routine including procedures associated with SAS discovery, authentication, and registration of the network node. That is, when initially deployed and powered up, a mobile network node 110 or WAP 160 will automatically perform various an initialization functions and discovery functions so as to establish proper operation within the context of the relevant service provider network.

At step 320, the CBSD provides location information to SAS and performs SAS spectrum inquiry and spectrum grant procedures to receive thereby a grant of location-appropriate channels/frequencies, which grant may further include limitations on transmit power levels associated with the granted channels/frequencies. The CBSD begins providing network services via channels/frequencies of the granted spectrum. That is, those mobile network nodes 110 and/or APs 160 of the service provider network configured for CBSD operation will communicate with the SAS 140 to provide thereto location data (e.g., derived via a GPS receiver), which location data will be used by the SAS 140 to help determine the available channels or frequencies for the location of the CBSD. The CBSD 110/160 and SAS 140 will engage in various spectrum inquiry, spectrum grant, and other procedures to enable the CBSD 110/160 to use specific unlicensed channels/frequencies to provide network services to UE 105 attached thereto.

At step 330, responsive to a change of indicated location from the GPS receiver, the CB SD uses velocity sensor information to determine if the change in indicated location is valid. That is, CBSD network nodes such as small Cells/APs routinely validate location to ensure both timing and location are correctly registered. Occasionally, such network nodes will detect a change in location and, to ensure/validate that the correct frequencies are being used at this new location, perform a cold or warm restart to invoke initialization that will ensure correct frequency selection and associated radiation permissions.

Specifically, if the GPS receiver 243 indicates a location change, but the velocity sensor 244 does not sense movement that would be associated with such a location change, then a determination is made that the indicated location change is not accurate. Such movement may comprise a force displacement over a period of time indicative of a motion of the CB SD from the initial location and toward the newly indicated location.

At step 340, if indicated location change valid, then new SAS spectrum grant likely needed (the method 300 optionally stops using the frequencies and/or waits until CBSD movement stops before reengaging with the SAS).

At step 350, if the indicated location change not valid, then a new SAS spectrum grant is not needed (i.e., initialization to cause such new grant not needed) and the CBSD continues providing network services via channels/frequencies of exiting granted spectrum.

It is noted that the method 300 of FIG. 3 is primarily described with respect to a CB SD node 200 utilizing CBRS frequencies allocated via a SAS. However, the apparatus and methods described herein with respect to the figures are also applicable to WiFi access points (APs) and the, which typically use automatic frequency coordination (AFC) or similar management entities. In this embodiments, a goal is to also avoid an imprecise GPS location giving rise to a device initialization or reset, as well as a reduction of transmit. That is, based on location the transmit power of an AP may be reduced to a level appropriate to an indicated new location from the GPS receiver 243, which transmit power may be insufficient to provide an appropriate Quality of Service (QoS) level to subscribers.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A network node configured to provide network services to user equipment (UE) attached thereto, comprising:
   a global positioning system (GPS) receiver, configured to detect a location of the network node;
   a processor, configured to invoke an initialization of the network node in response to a detection of a new location of the network node; and
   a velocity sensor, configured to detect a force indicative of a movement of the network node;
   wherein the processor is further configured to inhibit initialization of the network node in response to the velocity sensor indicating less than a threshold level of motion.

2. The network node of claim 1, wherein the velocity sensor comprises a piezoelectric velocity sensor.

3. The network node of claim 1, wherein the velocity sensor comprises one of a Micro Electro-Mechanical System (MEMS) velocity sensor and a moving coil velocity sensor.

4. The network node of claim 1, wherein:
   the network node comprises a Citizens Broadband Radio Service Device (CBSD) utilizing spectrum associated with a Citizens Broadband Radio Service (CBRS) to provide network services to user equipment (UE) attached thereto; and
   the initialization of the network node comprises at least SAS spectrum inquiry and spectrum grant procedures.

5. The network node of claim 4, wherein the initialization of the network node comprises SAS discovery, authentication, and registration of the network node.

6. The network node of claim 5, wherein the initialization of the network node comprises a reduction in transmit power of the network node.

7. The network node of claim 1, wherein the network node comprises a small or micro cell mobile radio access network (RAN) within a network of RANs.

8. The network node of claim 1, wherein the network node comprises an 802.xx wireless access point (WAP).

9. The network node of claim 1, further comprising an altimeter configured to detect altitude of the network node, wherein the processor is further configured to inhibit initialization of the network node in response to the altimeter indicating less than a threshold level of altitude change.

10. Apparatus configured to inhibit an initialization of a network node configured to provide network services to user equipment (UE) attached thereto, the apparatus comprising:
    a processor, operably coupled to a global positioning system (GPS) receiver configured to detect a location of the network node, and to a velocity sensor configured to detect a force indicative of a movement of the network node;
    the processor being configured to invoke an initialization of the network node in response to the GPS receiver detecting a new location of the network node; and
    the processor being configured further to inhibit the initialization of the network node in response to the velocity sensor indicating less than a threshold level of motion of the network node.

11. The apparatus of claim 10, wherein:
    the velocity sensor comprises one of a piezoelectric velocity sensor, a Micro Electro-Mechanical System (MEMS) velocity sensor, and a moving coil velocity sensor.

12. The apparatus of claim 10, wherein:
the network node comprises a Citizens Broadband Radio Service Device (CBSD) utilizing spectrum associated with a Citizens Broadband Radio Service (CBRS) to provide network services to user equipment (UE) attached thereto; and
the initialization of the network node comprises at least SAS spectrum inquiry and spectrum grant procedures.

13. The apparatus of claim 12, wherein:
the network node comprises a small or micro cell mobile radio access network (RAN) within a network of RANs; and
the initialization of the network node comprises at least one of SAS discovery, authentication, and registration of the network node, and a reduction in transmit power of the network node.

14. A method for controlling an initialization of a network node, comprising:
at a network node including a velocity sensor and configured to provide network services to user equipment (UE) attached thereto, determining via the velocity sensor whether a change in location reported by a global positioning system (GPS) receiver is correct; and
at the network node, responsive to a determination that the change in location reported by the GPS receiver is not correct, inhibiting an initialization of the network node normally invoked in response to the change in location of the network node.

15. The method of claim 14, wherein the velocity sensor comprises one of a piezoelectric velocity sensor, a Micro Electro-Mechanical System (MEMS) velocity sensor, and a moving coil velocity sensor.

16. The method of claim 14, wherein:
the network node comprises a Citizens Broadband Radio Service Device (CBSD) utilizing spectrum associated with the Citizens Broadband Radio Service (CBRS) to provide network services to user equipment (UE) attached thereto; and
the initialization of the network node comprises at least SAS spectrum inquiry and spectrum grant procedures.

17. The method of claim 16, wherein the initialization of the network node further comprises a reduction in transmit power of the network node.

18. The method of claim 14, wherein the network node comprises a small or micro cell mobile radio access network (RAN) within a network of RANs.

19. The method of claim 14, wherein the network node comprises an 802.xx wireless access point (WAP).

20. The method of claim 14, further comprising:
detecting an altitude of the network node using an altimeter associated with the network node and inhibiting initialization of the network node in response to the altimeter indicating less than a threshold level of altitude change.

21. A tangible and non-transitory computer readable storage medium storing instructions which, when executed by a computing device associated with a network node, adapt an operation of the computing device to provide method for controlling initialization of the network node, the method comprising:
at a network node including a velocity sensor and configured to provide network services to user equipment (UE) attached thereto, determining via the velocity sensor whether a change in location reported by a global positioning system (GPS) receiver is correct; and
at the network node, responsive to a determination that the change in location reported by the GPS receiver is not correct, inhibiting an initialization of the network node normally invoked in response to the change in location of the network node.

* * * * *